US007400253B2

(12) United States Patent  
Cohen

(10) Patent No.: US 7,400,253 B2  
(45) Date of Patent: Jul. 15, 2008

(54) HARVESTING AMBIENT RADIO FREQUENCY ELECTROMAGNETIC ENERGY FOR POWERING WIRELESS ELECTRONIC DEVICES, SENSORS AND SENSOR NETWORKS AND APPLICATIONS THEREOF

(75) Inventor: Marc H. Cohen, Silver Spring, MD (US)

(73) Assignee: MHCMOS, LLC, Silver Spring, MD (US)

( * ) Notice: Subject to any disclaimer, the term of this patent is extended or adjusted under 35 U.S.C. 154(b) by 239 days.

(21) Appl. No.: 11/459,459

(22) Filed: Jul. 24, 2006

(65) Prior Publication Data

US 2007/0109121 A1 May 17, 2007

Related U.S. Application Data

(60) Provisional application No. 60/705,636, filed on Aug. 4, 2005.

(51) Int. Cl.
*G08B 13/14* (2006.01)
(52) U.S. Cl. ............... 340/572.1; 340/572.3; 340/572.4; 340/539.1; 340/825.69; 340/825.72; 340/10.1; 235/383; 235/385; 320/108; 320/109
(58) Field of Classification Search .............. 340/572.1, 340/572.3, 572.4, 539.1, 635, 657, 825.69, 340/825.72, 10.1; 235/383, 385; 320/108, 320/109; 455/422.1
See application file for complete search history.

(56) References Cited

U.S. PATENT DOCUMENTS

| 6,127,799 | A | 10/2000 | Krishnan |
| 6,798,716 | B1 | 9/2004 | Charych |
| 6,972,682 | B2 * | 12/2005 | Lareau et al. ............ 340/568.1 |
| 7,084,605 | B2 | 8/2006 | Mickle et al. |
| 7,348,875 | B2 * | 3/2008 | Hughes et al. ............. 340/10.4 |
| 2003/0199778 | A1 | 10/2003 | Mickle et al. |
| 2004/0113790 | A1 * | 6/2004 | Hamel et al. ............. 340/572.1 |
| 2004/0259604 | A1 | 12/2004 | Mickle et al. |

* cited by examiner

*Primary Examiner*—Hung T. Nguyen
(74) *Attorney, Agent, or Firm*—Mohammad S. Rahman, Esq.; Gibb & Rahman, LLC

(57) ABSTRACT

A system and device for harvesting various frequencies and polarizations of ambient radio frequency (RF) electromagnetic (EM) energy for making a passive sensor (tag) into an autonomous passive sensor (tag) adapted to collect and store data with time-stamping and some primitive computation when necessary even when an interrogating radio frequency identification (RFID) reader is not present (not transmitting). A specific source of ambient RF EM energy may include wireless fidelity (WiFi) and/or cellular telephone base stations. The system and device may also allow for the recharging of energy storage units in active and battery assisted passive (BAP) devices. The system could be a "smart building" that uses passive sensors with RF EM energy harvesting capability to sense environmental variables, security breaches, as well as information from "smart appliances" that can be used for a variety of controls and can be accessed locally or remotely over the Internet or cellular networks.

35 Claims, 15 Drawing Sheets

HARVESTING AMBIENT RADIO FREQUENCY ELECTROMAGNETIC ENERGY FOR POWERING WIRELESS ELECTRONIC DEVICES, SENSORS AND SENSOR NETWORKS AND APPLICATIONS THEREOF

CROSS REFERENCE TO RELATED APPLICATION

This application claims the benefit of U.S. Provisional Patent Application No. 60/705,636 filed on Aug. 4, 2005, the contents of which in its entirety is herein incorporated by reference.

BACKGROUND

1. Technical Field

The embodiments herein generally relate to wireless technology, and, more particularly, to harvesting ambient radio frequency (RF) electromagnetic (EM) energy for supplying, storing, recharging or supplementing the energy necessary to power active or passive wireless electronic devices, sensors and sensor networks.

2. Description of the Related Art

The ability of actively powered, battery assisted passive (BAP) and passive wireless sensors to remotely acquire, store and/or transmit data may open up a wide variety of medical, diagnostic, quality control, safety, supply chain, logistic and security applications. For an individual, the ability to determine, prior to consumption, whether a food item contains harmful bacteria or ingredients to which the individual is allergic is highly desirable. From a population's perspective, recent national and international events have increased the need for personal or distributed systems that can monitor and detect continuously in real-time or at periodic or irregular intervals in time, chemical agents, biological agents, radiological agents and other hazards locally or over wide geographical areas.

Examples of personal handheld wireless devices that can address these issues are cellular telephones (cell phones), personal data assistants (PDAs) and portable computers or notebooks (PCs). These are pervasive electronic devices that are networked via the Internet or cellular telephone networks. Generally, the abovementioned consumer electronic devices all require local energy storage (batteries) to provide mobility and portability, and do so until their local source of energy is depleted.

A new class of sensors such as Electronic Product Code (EPC) and Radio Frequency Identification (RFID) tags that include sensing capabilities are emerging as a generally inexpensive and effective means of addressing many wireless sensor applications such as, but not exclusively, cold-supply chain, food safety, quality control, environmental safety, medical, diagnostic, electro-immunoassays, consumer goods as well as homeland security, property and personal security applications.

Purely passive sensors, when actively interrogated by an RF transceiver (reader), use this received source of EM energy to power themselves up, to acquire readings from their sensors and then rebroadcast or reflect their specific identification code and sensor readings back to the interrogator. BAP tags use their batteries to acquire and store or log data from one or more sensors, but typically do not use their batteries to enhance their RF communication abilities. Active sensors have their own built in power source that can be used to acquire and store sensor readings at any time as well as enhance the reception and transmission of RF communications. Generally, passive EPC and RFID tags equipped with one or more sensors will require a source of energy to measure and store their acquired information at times other than during active interrogation by a reader.

Because of the cost of the conventional sensors and sensor readers in particular, broad deployment of a sensor network over a large geographical area or widespread use by individuals is currently not particularly feasible. Generally, a considerable problem with large geographical deployment is that if the sensors are actively powered, their power sources need to be replaced when depleted, again adding to the cost. In addition, wear on sensors or sensor surfaces, generally requires sensors to be replaced on a regular basis further increasing the cost. In addition, imprecision in sensors generally requires cross validation to eliminate false positives, increasing the number of sensors that must be deployed for each application and thus also increasing the cost.

Accordingly, in view of the foregoing, there remains a need for low cost wireless sensors that can harvest ambient EM energy to power themselves up, acquire sensor data or recharge their power sources (batteries in the case of active sensors and batteries in BAP sensors).

SUMMARY

In view of the foregoing, the embodiments herein provide wireless RF addressable sensor network architectures for individuals, homes, industries, and homeland security where a wireless reader can supply RF power to and communicate with RF addressable tags that include sensors. Each active, BAP or passive tag can be equipped to harvest ambient EM energy from its environment allowing it to be autonomous: the tag can acquire and store data from its sensors independently of any particular reader event. The harvested ambient EM energy could, in addition, be used to transmit an alarm or "read me!" signal when a vital "sensor event" occurs, or to charge a battery on or near the tag. For example, the reader could be an RFID reader, a broadband wireless fidelity (WiFi) device, a cell phone, PDA, PC or a hybrid thereof comprising of a device adapted to read an RFID tag's unique identification and sensor information and bi-directionally communicate this information over the Internet or cellular telephone networks. The embodiments herein are also directed towards RF addressable tags with sensors that may be produced at costs lower than most types of active or passive tags conventionally available and furthers the state of the art by including ambient EM energy harvesting capabilities.

The RF addressable sensor tag combines RFID tag functionality with sensor functionality. The RF addressable sensor includes one or more antennas for communicating with the tag reader, one or more sensor elements, an RF power and communications interface, an RFID control module, and a sensor interface. The RFID control module includes logic to control RFID tag communications with an RFID tag reader. The RFID control module may also include logic and memory necessary to store and/or process the acquired sensor data.

The embodiments herein additionally furthers the current state of the art by adding an ambient EM energy harvesting sub-system to passive, BAP, or active wireless sensor tags. The harvested energy is used to provide power to the passive sensor or to provide power to the BAP or active sensor or for recharging an energy source on the active sensor tag or BAP sensor tag. This harvested energy is used by the sensor tag for: the facilitation of autonomous data collection and/or storage; the processing of acquired data; and the transmission of an alarm or "read-me!" signal when a vital sensor variable is above or below a critical threshold or vital sensor variables are above or below critical thresholds.

The embodiments herein are also adapted to identify WiFi and cellular base stations as sources of readily available, known frequency, ambient RF EM energy that can be harvested to provide energy to the sensor tag. The embodiments herein are also capable of identifying microwave band frequencies consistent with IEEE 521-1984 designations (Bands L, S, C, X, Ku, K, Ka, V, and W) as ambient RF EM energy that can be harvested to provide energy to the sensor tag.

In an instantiation of the embodiments herein, an RFID reader is used to communicate with nearby sensor tags that are being energized by harvested ambient RF EM energy supplied by a nearby WiFi router/transceiver or cellular base station. The WiFi router/transceiver or cellular base station not only supplies the ambient energy for the sensor tags, but also bi-directionally communicates and distributes the collected sensor tag data over the Internet or cellular telephone networks.

In an aspect of the embodiments herein, the RFID reader and WiFi router/transceiver are combined into a hybrid RFID-WiFi reader whereby the RFID reader sub-system communicates with nearby sensor tags that are being energized by harvested ambient RF EM energy supplied by the WiFi router/transceiver part of the hybrid RFID-WiFi reader. The WiFi router/transceiver part of the hybrid RFID-WiFi reader also facilitates the local and/or remote distribution of the collected sensor tag data over the Internet.

In another aspect of the embodiments herein, the RFID, WiFi router/transceiver, and cell phone technology are combined into a hybrid RFID-WiFi-cell phone reader whereby the RFID and/or WiFi reader sub-system communicates with nearby RFID sensor tags and the WiFi and cell phone subsystems facilitate local and remote access to the collected sensor tag data over the Internet or via the cellular telephone networks. The WiFi router/transceiver part of the hybrid RFID-WiFi-Cell phone reader is also the source of ambient energy available for harvesting by the sensor tags.

In another aspect of the embodiments herein, a source that radiates EM energy at a known frequency may be placed in the vicinity of the passive, BAP or active sensor tags for the sole purpose of supplying ambient RF EM energy at frequencies that these wireless sensors can harvest.

The energy harvesting system may include an antenna or an array of antennas to collect ambient EM energy having a single wavelength or a multitude of wavelengths of single polarization or arbitrary polarizations. In another aspect of the embodiments herein the energy harvesting antenna or antennas may be used to supplement the wireless tag's communication antenna or antennas. In another instantiation of the embodiments herein, the energy harvesting antenna or array of antennas connects to an impedance matching network and a rectifying and combining module before being fed to the power converting and/or conditioning module.

In yet another instantiation of the embodiments herein, the energy harvesting antenna or array of antennas may be designed to directly rectify the harvested energy (a rectenna or array of rectennas) and feed the rectified energy to an energy combining module that in turn feeds a power converting and/or conditioning module.

In another aspect of the embodiments herein, the energy harvesting power converting and/or conditioning module can supplement the wireless tag's RF transceiver power and thereby its communication capabilities. Furthermore, the embodiments herein preferably do not interfere with the communications between RFID readers and wireless RF addressable tags.

Generally, the embodiments provide a system comprising an ambient RF EM energy source; a sensor reader operatively connected to the ambient RF EM energy source; and a sensor in communication with the sensor reader, wherein the sensor comprises a control module comprising an energy harvesting controller; a tag module controlled by the control module; a sensor module controlled by the control module; an energy harvesting module controlled by the energy harvesting controller and adapted to wirelessly collect the ambient RF EM energy; and a power module adapted to provide a power supply for the control module, the power supply being generated by the collected ambient RF EM energy, wherein the energy harvesting controller is adapted to (i) assess power requirements of each of the tag and sensor modules, (ii) transfer power from the energy harvesting module to any of the tag and sensor modules, and (iii) charge a local energy storage device.

In one embodiment, the sensor further comprises an antenna module shared by the energy harvesting module and the tag module, wherein the antenna module comprises a rectification and impedance matching network; at least one RF pad operatively connected to the rectification and impedance matching network; and at least one antenna operatively connected to each of the at least one RF pad. In another embodiment, the tag module comprises a memory component; a RF communication interface operatively connected to the memory component; at least one RF pad operatively connected to the RF communication interface; and at least one antenna operatively connected to each of the at least one RF pad. The sensor module may comprise a memory component; a sensor interface and support sub-system operatively connected to the memory component; at least one sensor pad operatively connected to the sensor interface and support sub-system; and at least one antenna operatively connected to each of the at least one sensor pad. Alternatively, the sensor module comprises a memory component; a sensor interface and support sub-system operatively connected to the memory component; and at least one antenna operatively connected to sensor interface and support sub-system. Preferably, the control module further comprises a RFID tag controller; and a sensor processing controller operatively connected to the RFID tag controller.

In one embodiment, the energy harvesting module comprises an energy harvesting interface and support sub-system; at least one RF harvesting pad operatively connected to an energy harvesting interface and support sub-system; and at least one antenna operatively connected to each of the at least one RF harvesting pad. Alternatively, the energy harvesting module comprises an energy harvesting interface and support sub-system; at least one pair of RF harvesting pads operatively connected to the energy harvesting interface and support sub-system; and at least one rectenna operatively connected to each of the at least one pair RF harvesting pads. The energy harvesting interface and support sub-system may comprise a storage component; a power conditioner component operatively connected to the storage component; and a combiner operatively connected to the power conditioner, wherein the energy harvesting interface and support sub-system comprises a rectification and impedance matching network operatively connected to the combiner. Preferably, the power module comprises a power charger; a power source operatively connected to the power charger; and a voltage regulator operatively connected to the power source.

Additionally, the collected ambient RF EM energy enables the electronic device to be a fully autonomous data collector, alarm generator, event generator, data logger, and data processor independent of any other device. Moreover, the sensor reader may comprise any of a cell phone, a PDA, a PC reader, a RFID reader, a broadband WiFi device, and a combination thereof. Preferably, the power supply is generated only by the collected ambient RF EM energy. Furthermore, the sensor may be adapted to transmit a wireless signal to the sensor reader, and wherein the sensor reader is adapted to receive the transmitted wireless signal from the sensor. Also, the collected ambient RF EM energy facilitates transmission of the wireless signal when a selected sensor variable meets a predetermined threshold. In one embodiment, the ambient RF EM energy source comprises a WiFi router adapted to allow the sensor reader to communicate over the Internet.

Alternatively, the ambient RF EM energy source comprises a hybrid WiFi router transceiver adapted to allow the sensor reader to communicate over the Internet. In another embodiment, the sensor is a RF ambient EM energy harvesting sensor and is arranged with a plurality of other the sensors each adapted to collect data for climate control, security alarms, environmental alarms, and information gathering from other devices located within a communicable distance from the sensor, wherein all of the sensors are adapted to be any of locally and remotely monitored via any of the Internet and a cell phone network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
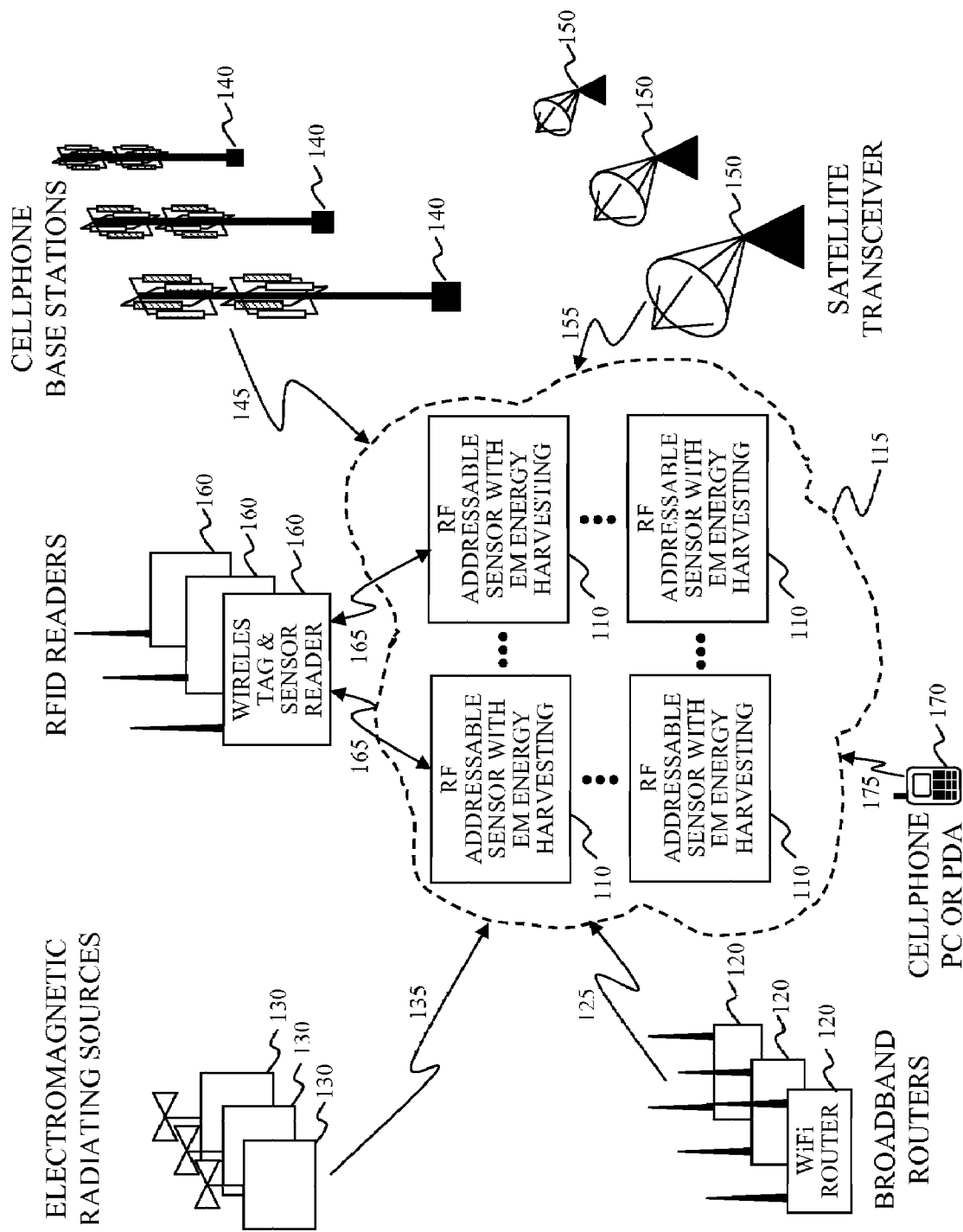
FIG. 1 is a schematic diagram illustrating an example of ambient RF EM energy harvesting for gathering, accumulating, and storing energy and powering passive wireless sensors or sensor tags and/or recharging BAP and/or active wireless sensors or sensor tags all of which are equipped with ambient EM energy harvesting technology according to an embodiment herein;.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for low cost wireless sensors that can harvest ambient EM energy to power themselves up, acquire sensor data or recharge their power sources (batteries in the case of active sensors and batteries in BAP sensors). The embodiments herein achieve this by providing a technique for harvesting ambient RF EM energy for supplying, storing, recharging or supplementing the energy necessary to power active, BAP or passive wireless electronic devices, sensors and sensor networks, allowing them to become autonomous "data loggers" and/or empowering them to transmit their unique identification and sensor information when a sensed variable or a combination of sensed variables exceeds a threshold and triggers a vital "sensor event".

More specifically, the embodiments provide a system and device for harvesting various frequencies and polarizations of ambient RF EM energy for making a passive sensor (tag) into an autonomous passive sensor (tag) adapted to collect and store data with time-stamping and some primitive computation when necessary even when an interrogating RFID reader is not present (not transmitting). A specific source of ambient RF EM energy may include WiFi. The system and device may also allow for the recharging of energy storage units in active and BAP devices. The system could be a "smart building" that uses passive sensors with RF EM energy harvesting capability to sense environmental variables, security breaches, as well as information from "smart appliances" that can be used for a variety of controls and can be accessed locally or remotely over the Internet or cellular telephone networks. Referring now to the drawings, and more particularly to FIGS. 1 through 9B, where similar reference characters denote corresponding features consistently throughout the figures, there are shown preferred embodiments.

The embodiments herein relate to ambient EM energy harvesting for powering passive wireless sensors and for recharging energy storage devices on active or BAP wireless sensors. The RF frequency band from 3 KHz to 300 GHz, and a subset of this band, the Microwave Frequency Band from 1 GHz to 110 GHz (as designated in IEEE 521-1984) are identified as the most ubiquitous sources of ambient energy available for energy harvesting.

The embodiments herein furthers the current state of the art by focusing on RFID sensor tag technologies that may be purely passive (i.e., no on-board power supply but may have on-board energy storage devices) and/or active (i.e., having on-board energy storage as the power supply) and/or BAP (i.e., also having on-board energy storage as the power supply). The distinction between active and BAP wireless sensors is made here: an active tag uses its local power source to power up its sensors and boost its RF receive and transmit communications power while a BAP tag uses its local power source to power up and collect data from its sensors alone.

In particular IEEE standards 802.11a, 802.11b, and 802.11g and WiFi routers/transceivers used in homes, businesses, warehouses, stores and in towns or cities transmit a known wavelength (or frequency) in the S-band (2 GHz to 4 GHz) and the C-band (4 GHz to 8 GHz). This source of energy can be optimally harvested with a combination of appropriately designed antenna or antennas and rectenna or rectennas, impedance matching circuits, voltage regulation circuits and energy storage devices and can be used for supplying energy to wireless sensors, be they passive, BAP or active.

EM energy transmitted by cell phone towers (cellular base stations) is also designated as a ubiquitous source of energy of known wavelength (or frequencies in the 800 MHz to 1.9 GHz), and may likewise be optimally harvested and processed for supplying energy to wireless sensors, be they passive, BAP or active.

In addition a further improvement to the state of the art and provided by the embodiments herein is a hybrid RFID-WiFi transceiver that combines an RFID sensor tag reader and a WiFi router/transceiver into a device that can provide ambient EM energy to RFID sensor tags, read their unique identity and data from the tag and transmit this data over the Internet. The hybrid RFID-WiFi transceiver enables remote query of RFID sensor tags' identity and data via the Internet.

An additional improvement to the state of the art provided by the embodiments herein is a hybrid RFID-WiFi-cell phone transceiver that combines an RFID sensor tag reader, a WiFi router/transceiver, and a cell phone into a device that can provide ambient EM energy to RFID sensor tags, read their unique identity and data from the tag and transmit this data over the Internet and/or cellular telephone networks. The hybrid RFID-WiFi-cell phone transceiver enables remote query of RFID sensor tags' identity and data over the Internet as well as via cellular telephone networks.

The embodiments herein further improves upon the state of the art by making it possible for purely passive sensors to harvest available EM energy from their environment, and locally accumulate and store this energy so that passive tags become autonomous; i.e., they can log data and they can transmit an alarm or "read me!" signal to a nearby reader when a critical sensor event occurs or when a critical combination of sensor events occur or when a sensor level or combination of sensor levels has crossed a threshold.

FIG. 1 is an illustrative scenario of some of the forms of ambient EM energy that may be available for harvesting by passive RF addressable sensor tags 110 with energy harvesting capability. The ambient EM energy bathing the environment 115 in which the tags 110 are placed can come from a number of different sources including broadband WiFi routers/transceivers 120 (including but not limited to IEEE 802.1x, IEEE 802.15.4 "Zigbee®" electronic devices, Bluetooth® telecommunication equipment, HomeRF® computer hardware/software, HiperLAN/1 and HiperLAN/2), an EM transmitter 130 continuously or periodically radiating a known frequency (or frequencies), Microwave IEEE 521-1984 or cell phone base stations 140, satellite transceivers 150, wireless tag sensor readers 160, and cell phones, PDAs or PCs 170.

The energy that each of these sources contribute to the total amount of ambient EM energy available for harvesting by the antenna (not shown) of the tag 110, $P_{RF}(t)$ 125, 135, 145, 155, 165, 175 respectively, is a function of time, position/distance, frequency, solid angle and polarization state:

$$P_{RF} = \frac{1}{f_2 - f_1} \int_{f_1}^{f_2} \int_0^{4\pi} \Phi(\Omega, f, t) A_{eff}(\Omega, f) d\Omega df$$

where $\Omega$ is the solid angle in steradians, $\Phi(\Omega,f,t)$ is the time-varying frequency and angle-dependent incident power density and $A_{eff}$ is the angle-, frequency-, and polarization-dependent effective area of the antenna.

The available power $P_{RF}(f_i)$ at any frequency $f_i$ is an alternating current (ac) signal that must be converted to a direct current (dc) signal by a nonlinear device or rectifier (not shown) before being summed together with all other energy sources of different frequencies, $f_1 \ldots _n$, which have been similarly rectified. The dc power, $P_{dc}$ at a single frequency, $f_i$ is given by:

$$P_{dc}(f_i) = P_{RF}(t, f_i)\eta[P_{RF}(t, f_i), \beta]$$

where $\eta = P_{dc}/P_{RF}$ is the total received rectified and summed power conversion efficiency (including the loss due to reflected power), and $\beta(P_{dc}, f_i)$ represents the extent to which the rectifying device (not shown) and the antenna are impedance matched at the received dc power level, $P_{dc}$ and frequency $f_i$.

The anticipated ambient power densities that can be harvested and converted to dc power at useful voltage levels is approximately in the range $10^{-1}$ mW/cm$^2$ (the FCC exposure limit for 880 MHz and 1990 MHz) to $10^{-6}$ mW/cm$^2$. One skilled in the art can optimize the harvested dc power, $P_{dc}$ by appropriately adjusting the parameters $A_{\mathit{eff}}$ and/or the parameters $\eta$ and, $\beta$.

Figure 2:
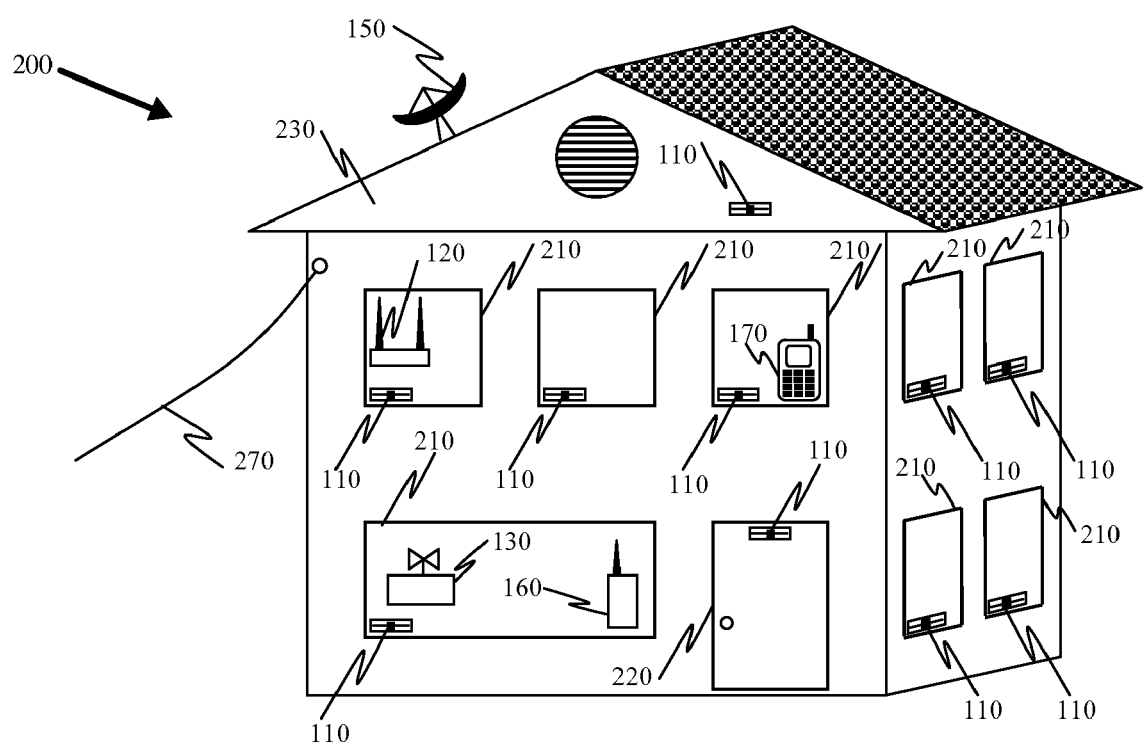
FIG. 2 is a schematic diagram illustrating the deployment of wireless addressable sensor tags with on-board EM energy harvesting technology in a home, business, office, warehouse, or building according to an embodiment herein.

FIG. 2 is an illustrative example of a "smart home" 200 where RF addressable sensor tags 110 with energy harvesting capability are mounted on windows 210, a door 220, and in the attic 230. Wired 270 or satellite transceiver 150 broadband Internet access is connected to a WiFi router 120 which bathes the smart house 200 in RF energy. Alternatively, an RF EM source 130 of known frequency continuously or periodically radiates energy specifically for the purpose of providing energy for the RF addressable sensor tags 110 with energy harvesting capability. An RFID tag reader 160 or a cell phone, PDA or PC 170 can read the unique identity and sensor data from each passive sensor tag 110. The sensor tags 110 can be used to monitor environmental conditions such as temperature, humidity, carbon monoxide levels, radiation levels or smoke inside the house and the data read from the sensor tags 110 may be used to control HVAC systems or sound alarms when sensor thresholds are exceeded. The same sensor tags 110 can be used to detect unwanted intruders via vibration detectors, breakage detectors and open door detectors. Accordingly, the data from such sensors 110 can be used in a home security monitoring device. Similarly, addressable sensor tags 110 with energy harvesting capability can be placed on home appliances such as refrigerators, stoves, hot water heaters and gas/oil furnaces to monitor their operating state. Since the smart house 200 is connected to the Internet 270, 150, and/or via a cell phone 170, all sensor data can be accessed locally and/or remotely over existing Internet and/or cellular telephone networks. Again, these sensors 110 harvest ambient energy from any or all of the available modes of RF EM energy bathing the house 200. This energy could be used to power the passive sensor tags 110 or recharge batteries or other power sources associated with active or BAP tags 110.

Figure 3A:
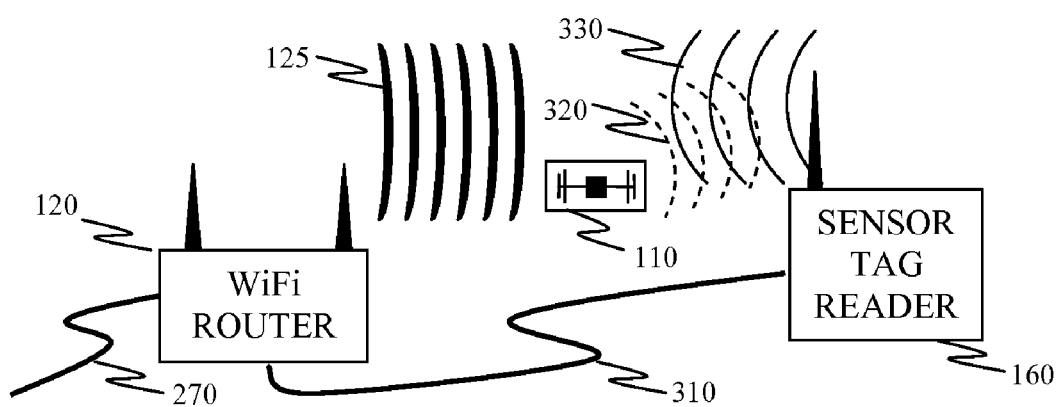
FIG. 3A is a schematic diagram illustrating an example of a WiFi wireless router/transceiver, connected to the Internet, bathing passive and/or BAP and/or active wireless sensor tags with energy at a known frequency or known frequencies according to an embodiment herein.

FIG. 3A illustrates an example of a WiFi router/transceiver 120 connected to the Internet 270, bathing passive, BAP or active wireless sensor tags 110 with energy at a known frequency 125. This particular source of ambient energy supplies the passive sensor tag 110 with power or facilitates recharging batteries or other on-board or nearby energy storage devices. A single tag reader 160 (or a plurality of tag readers) is adapted to interrogate 330 each uniquely identifiable sensor tag 110 for information about its particular sensor tag reading(s) 320 and pass this information to the WiFi router/transceiver 120 via a direct connection 310 to make it locally or remotely accessible via the Internet and/or cell phone networks. This particular source of ambient energy can supply the passive sensor tag 110 equipped with energy harvesting capability with power for autonomous data collection and storage, or facilitate recharging batteries or other energy storage devices.

Figure 3B:
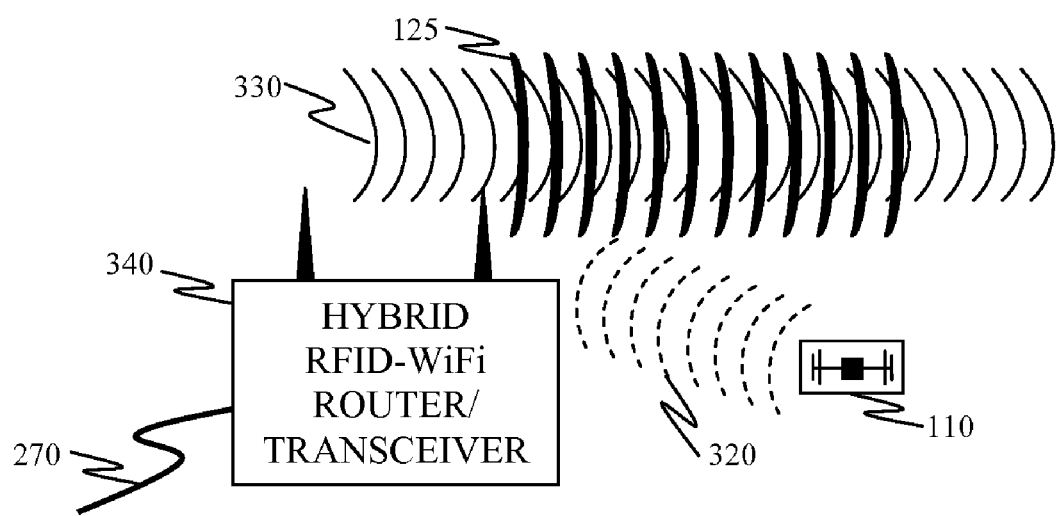
FIG. 3B is a schematic diagram illustrating an example of a hybrid RFID-WiFi wireless router comprising an RFID tag reader module combined with a WiFi router/transceiver connected to the Internet according to an embodiment herein.

FIG. 3B illustrates a hybrid RFID-WiFi wireless router 340 comprising an RFID tag reader module combined with a WiFi router/transceiver connected to the Internet 270. This hybrid RFID-WiFi reader/module 340 provides a source of ambient energy 125 which the sensor tag 110 can harvest to supply itself with power to become an autonomous sensor 110 able to collect and save data as well as send out an alarm if its reading(s) has/have crossed a predefined threshold or a combination of predefined thresholds. The harvested energy can also facilitate recharging batteries or other energy storage devices associated with each tag 110. The hybrid RFID-WiFi router/transceiver 340 periodically or sporadically interrogates 330 each uniquely identifiable sensor tag 110 for its data, and each uniquely identifiable sensor tag 110 rebroadcasts 320 its particular sensor(s) reading(s) back to the RFID-WiFi router/transceiver 340 which makes that data accessible over the Internet.

Figure 3C:
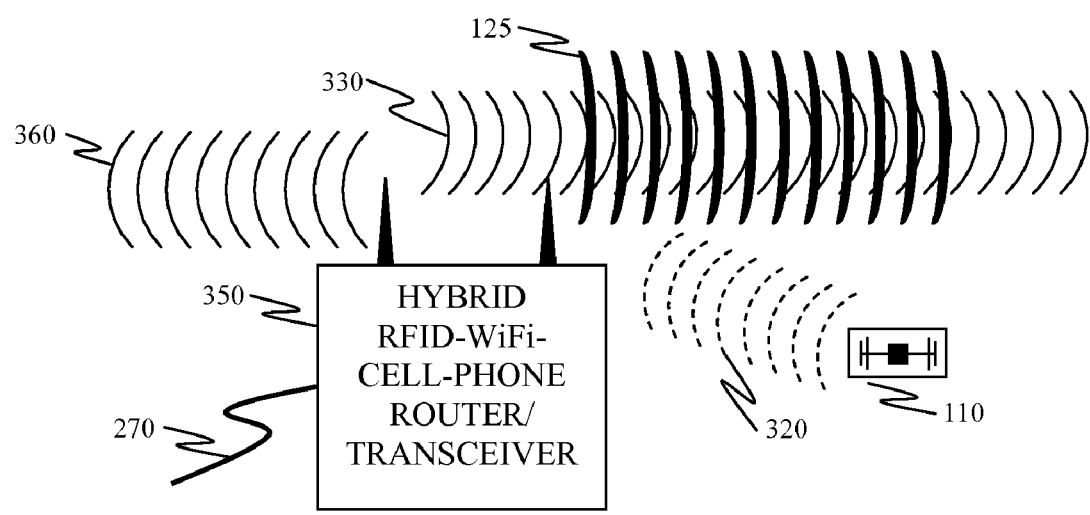
FIG. 3C is a schematic diagram illustrating an example of a hybrid RFID-WiFi-cell phone wireless router comprising an RFID tag reader module, a WiFi router/transceiver module that facilitates connection to the Internet, and a cell phone module that facilitates connection to cellular telephone networks according to an embodiment herein.

FIG. 3C illustrates a hybrid RFID-WiFi-Cell phone router/transceiver 350 comprising an RFID tag reader module, a WiFi router/transceiver module and a cell phone module. This hybrid RFID-WiFi-Cell phone reader module 350 provides a source of ambient energy 125 which the sensor tag 110 can harvest to supply itself with power to become an autonomous sensor 110 able to collect and store data as well as send out an alarm if its reading(s) has/have crossed a predefined threshold or a combination of predefined thresholds. The harvested energy can also facilitate recharging batteries or other energy storage devices associated with each tag 110. The hybrid RFID-WiFi-Cell phone router/transceiver 350 periodically or sporadically interrogates 330 each uniquely identifiable sensor tag 110 for its data, and each uniquely identifiable sensor tag 110 rebroadcasts 320 its particular sensor(s) reading(s) back to the hybrid RFID-WiFi-Cell phone router/transceiver 350 which is connected to the Internet 270 and makes that data accessible over the Internet as well as over cellular telephone networks.

Figure 4A:
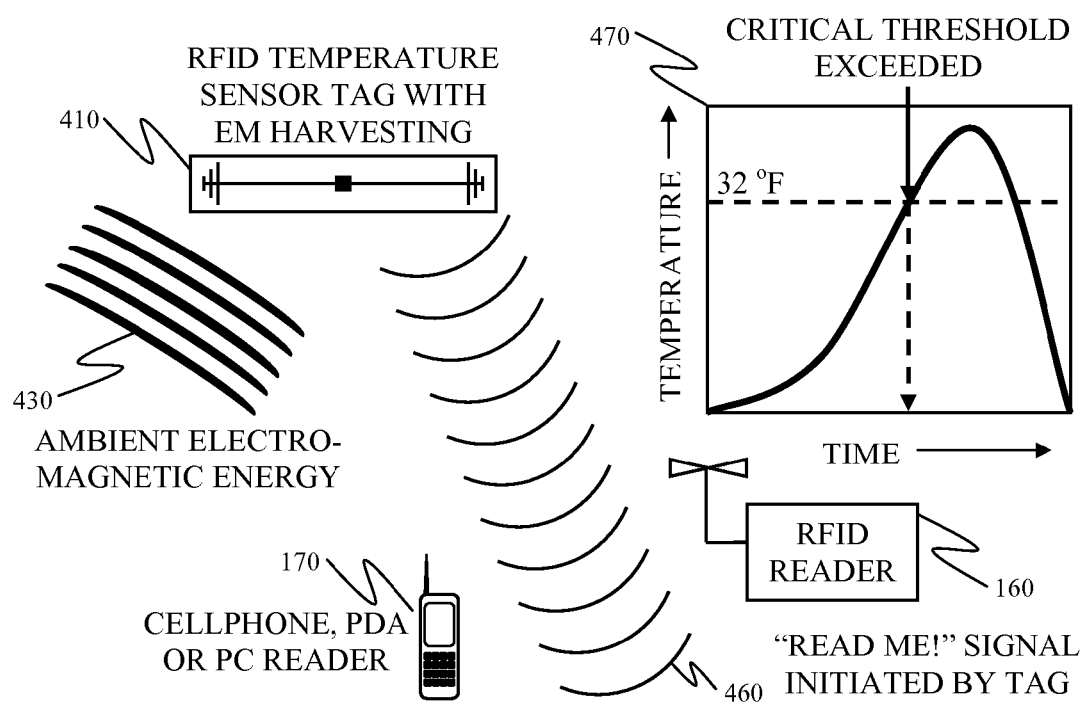
FIG. 4A is a schematic diagram illustrating an example of an RFID sensor tag equipped with an energy harvesting sub-system that initiates an alarm or "read me!" signal when a measured variable or combination of measured variables exceeds a predefined critical threshold according to an embodiment herein.

FIG. 4A illustrates an RFID temperature sensor tag 410 equipped with energy harvesting capability. Ambient EM energy 430 is harvested by the sensor tag 410. This harvested energy is used by the tag 410 to continuously, periodically, or sporadically measure its sensor's value and compare that value with a pre-programmed threshold 470. If this threshold is crossed, the tag 410 initiates and broadcasts an alarm or "read me!" signal 460 which is read by an RFID reader 160 or cell phone, PDA, or PC reader 170 along with its unique identification number. In this particular illustrative example the tag 410 senses temperature, but in general, the sensor or sensors of the tag 410 could measure a variety of environmental or physical variables. The unique identification and sensor data of the tag 410 can then be read by a standalone RFID reader 160 or by a cell phone, PDA, or PC reader 170.

Figure 4B:
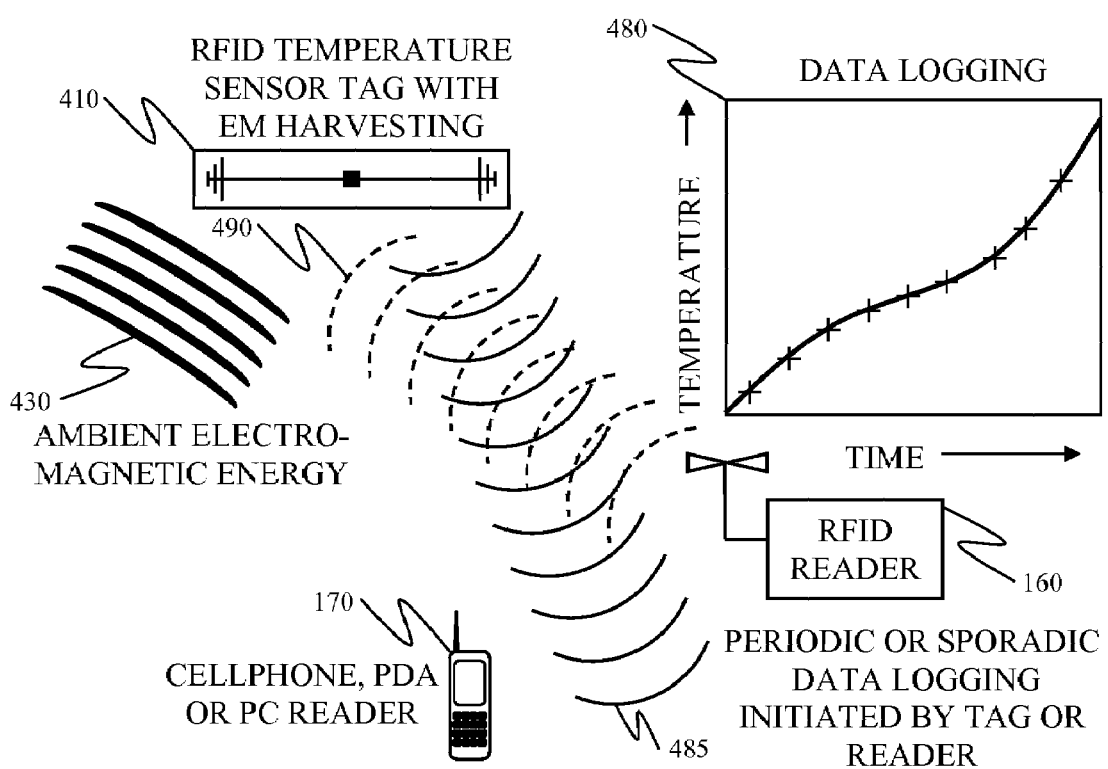
FIG. 4B is a schematic diagram illustrating an example of an RFID sensor tag equipped with the energy harvesting sub-system logging (writing to memory) the sensed data according to an embodiment herein.

FIG. 4B illustrates an RFID temperature sensor tag 410 equipped with energy harvesting capability that uses ambient EM energy 430 to provide a continuous, periodic, or sporadic source of power to the RFID temperature sensor tag 410. The sensor tag 410 logs data to local memory 480 and can periodically or sporadically initiate and broadcast a signal 485, which can be read by the RFID reader 160. The RFID reader 160 can also periodically or sporadically initiate a read 490 of the unique identification and data of the tag 410. In this particular illustrative example the tag 410 senses temperature, but in general, the sensor or sensors of the tag 410 could measure a variety of environmental or physical variables. The unique identification and sensor data of the tag 410 can then be read periodically or sporadically either when a sensor event initiates a "read me!" signal 485, or when a standalone RFID reader 160 or a cell phone, PDA, or PC reader 170 initiates a read cycle 490.

Figure 5A:
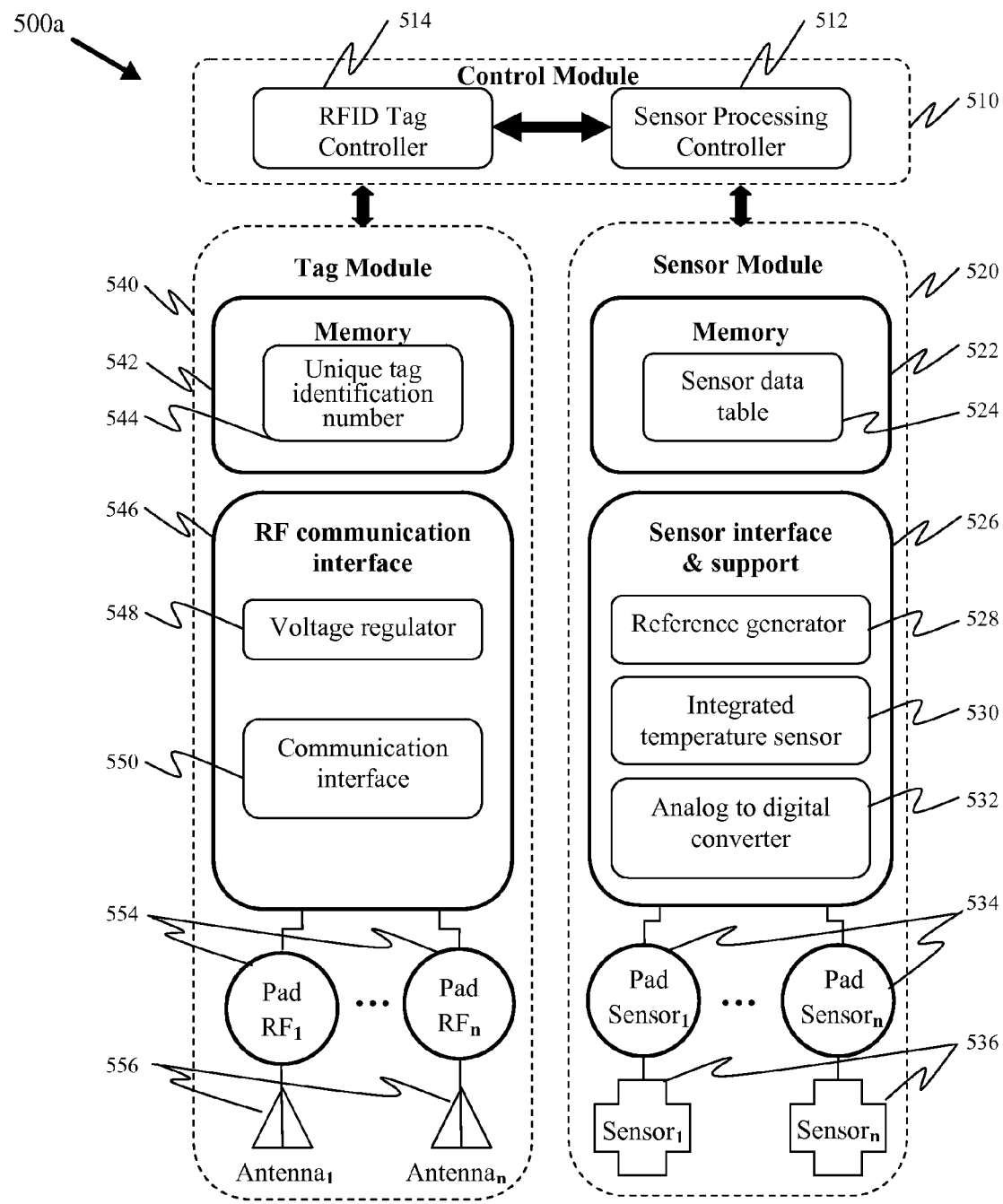
FIG. 5A is a block diagram illustrating a passive wireless RF addressable tag module with a sensor module.

FIG. 5A illustrates a passive wireless RF addressable sensor tag 500a, which may be used as a basis for designing the embodiments herein. The passive RFID tag 500a includes three main modules: the control module 510, the tag module 540, and the sensor module 520. The control module 510 has an RFID tag controller 514 and a sensor processing controller 512 that can communicate with each other. The RFID tag controller 514 communicates with and controls the tag module 540. The tag module 540 has on-board memory 542 and an RF communication interface 546. The memory 542 holds the unique identification number and additional information 544 associated with that particular sensor tag 500*a*. The RF communication interface 546 has a voltage regulator 548 and a communication interface 550. The RF communication interface 546 connects to a single antenna or a multitude of antennas 556 through an RF pad or a multitude of RF pads 554. The sensor module 520 has its own memory 522 and a sensor interface and support sub-system 526. The memory 522 stores the sensor data table 524 that include sensor calibration parameters, lookup tables as well as data collected from the sensor or sensors of the sensor tag 500*a*. The sensor interface and support sub-system 526 has a voltage and/or current reference generator 528, an integrated temperature sensor 530 and an analog to digital converter 532. An external sensor or a multitude of external sensors 536 are connected to the sensor interface and support sub-system 526 via a sensor pad or a multitude of sensor pads 534.

Figure 5B:
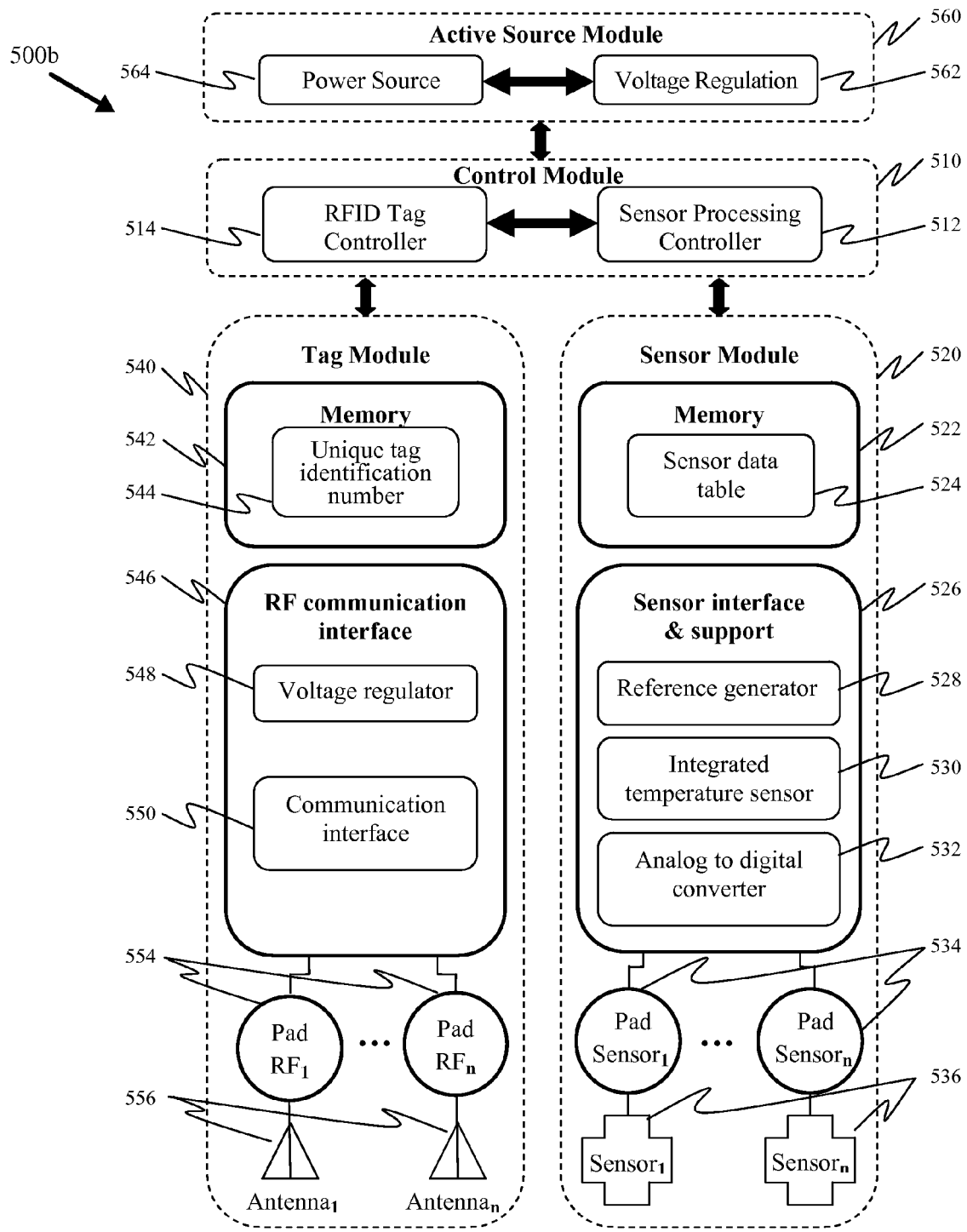
FIG. 5B is a block diagram illustrating an active wireless RF addressable tag module with a sensor module.

FIG. 5B illustrates an active or BAP wireless RF addressable sensor tag 500*b*, which may be used as a basis for designing the embodiments herein. In addition to all of the components described with FIG. 5A above, there is also an active source module 560 which communicates with the control module 510. The active source module 560 includes a power source 564 which could be replaceable and/or rechargeable, and voltage regulation circuitry 562 which regulates the voltage and/or current necessary to recharge the power source 564 and supply power to the remainder of the sensor tag 500*b*.

Figure 6:
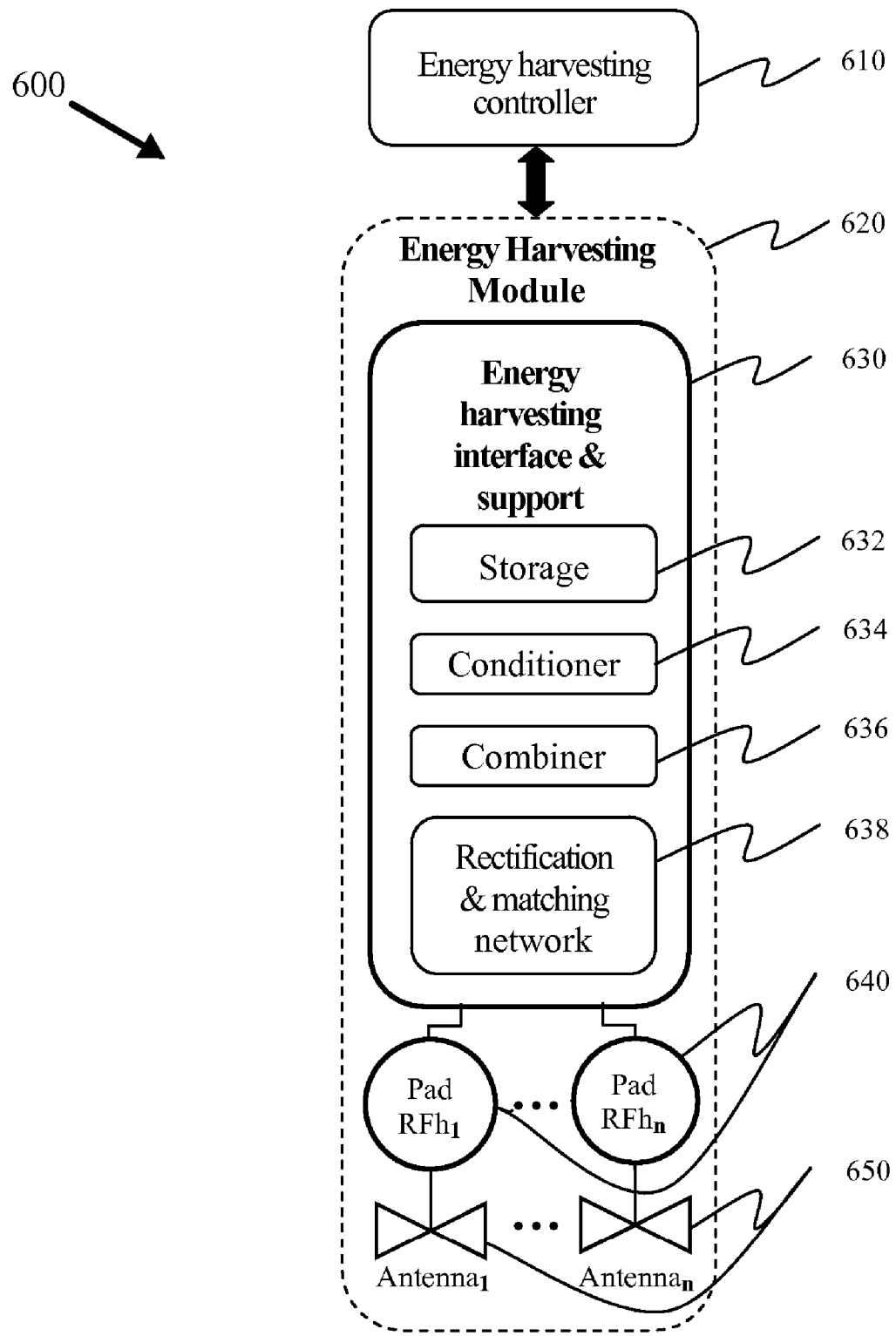
FIG. 6 is a block diagram illustrating an EM energy harvesting sub-system architecture according to an embodiment herein.

FIG. 6 is an illustrative example of a block diagram of the embodiments herein as it relates to the harvesting of ambient EM energy for supplying, storing, recharging, or supplementing the energy necessary to power active, BAP or passive wireless electronic devices, sensors and sensor networks. The EM energy harvesting sub-system architecture 600 comprises a single antenna 650, rectifier and matching network 638 or an array of antennas 650, rectifiers and matching networks 638, a combiner 636, a power conditioner 634, and an energy storage device 632. The energy harvesting controller 610 communicates bi-directionally with the energy harvesting module 620 and RFID tag controller 514, wherein both the energy harvesting controller 610 and energy harvesting module 620 may or may not be integrated into an RFID sensor chip (not shown), depending on the particular application. The energy harvesting controller 610 sporadically, periodically or continuously controls and monitors the state of the energy harvesting module 620. The energy harvesting module 620 includes an energy harvesting interface and support sub-system 630 that connects to an external energy harvesting antenna or multitude of external energy harvesting antennas 650 through an RFh (RF harvesting) pad or a multitude of RFh pads 640.

The antenna or multitude of antennas 650 may be designed to collect ambient EM energy at either a single frequency $f_1$, a range of frequencies $f_i$, i=1, 2, 3 ... N, or a specific set of frequencies, for example $f_{\{i,j,k\}i}$={13.56 MHz, 438 MHz, 928 MHz, 2.54 GHz}. Moreover, the polarization state of the energy within the aperture of a single energy harvesting antenna or a multitude of energy harvesting antennas 650 can be arbitrary. Furthermore, the aperture or effective area $A_{eff}$ of an energy harvesting antenna or multitude of energy harvesting antennas 650 can be optimized for a wavelength, and/or a range or set of wavelengths of the received EM energy, and can be readily accomplished by those skilled in the art.

The EM energy harvested by an energy harvesting antenna or a multitude of energy harvesting antennas 650 presents an ac signal or a multitude of ac signals to the rectification and matching network 638. The matching network 638 is preferably designed to optimally match the frequency, polarization state and signal strength (power) dependence $\beta(P_{dc}, f_i)$ of the output impedance of the harvesting antenna(s) 650 and the input impedance of the rectification element or elements 638 to ensure maximum power transfer or harvesting efficiency. The rectifier or rectifiers 638 convert the ac signal(s) into a dc or voltage signal(s).

The combiner 636 takes its input from the output of the rectification and matching network 638 and combines the currents or voltages in any combination of series or parallel connections in order to provide the necessary quantity of dc power for passive, BAP, or active sensor tag operation. The conditioner 634 takes the dc power from the combiner 636 and converts this dc power into a specified voltage level and/or current level with efficiency η by using circuit techniques known by those skilled in the art. The voltage and/or current level may be determined by the requirements of the local energy storage device 632 and/or the active source module 560. The storage device 632 acts as local storage and may be implemented using any or a combination of capacitors, supercapacitors, plastic batteries, polymer batteries, Li-Ion batteries, or any rechargeable energy storing technology that can be integrated within the energy harvesting module 620.

Figure 7A:
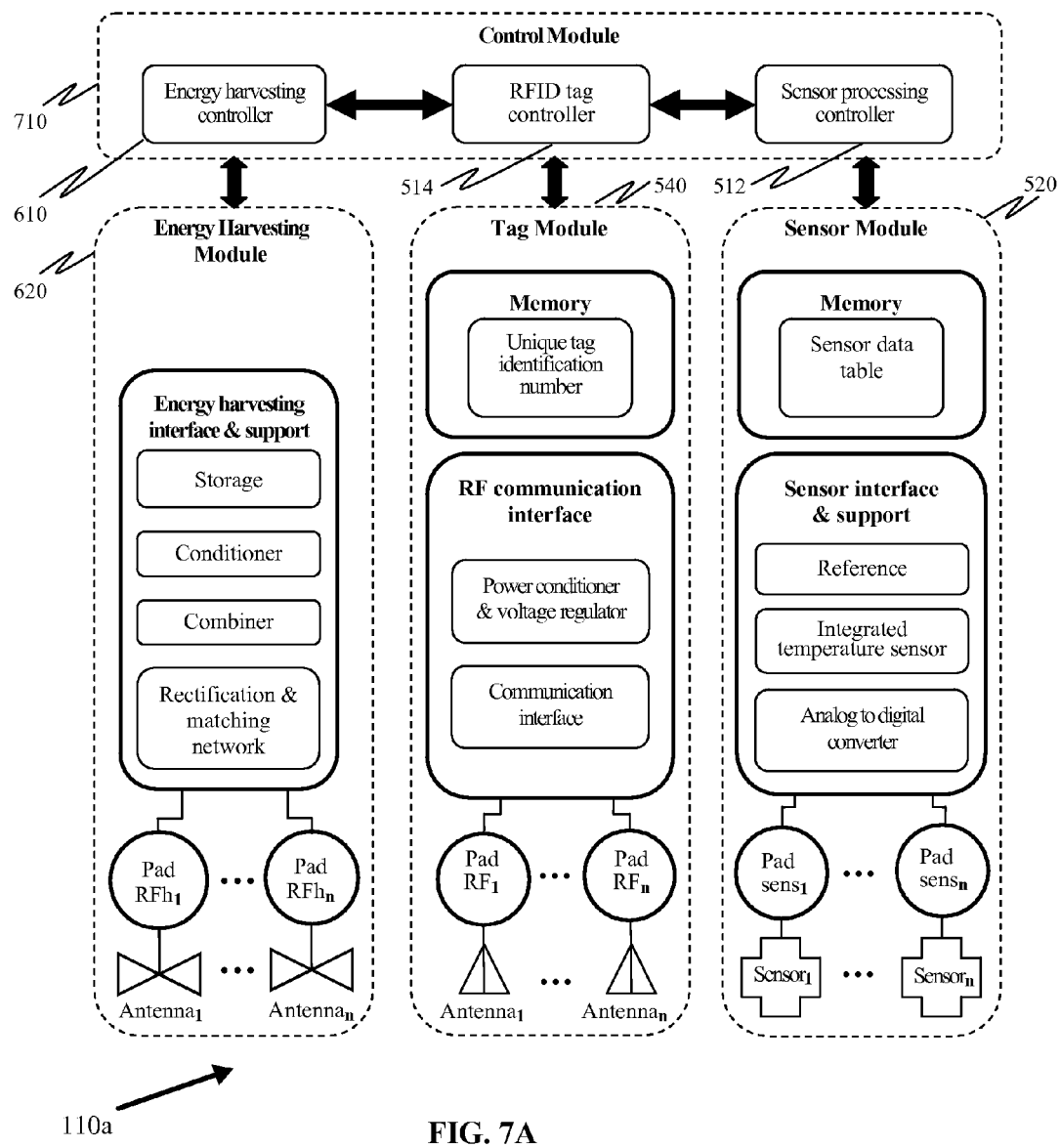
FIG. 7A is a block diagram illustrating a passive wireless RF addressable tag with a sensor module combined with an EM energy harvesting sub-system architecture according to an embodiment herein.

FIG. 7A is an illustrative block diagram of an instantiation of a passive sensor tag 110*a* that includes a control module 710, a tag module 540, a sensor module 520, and an energy harvesting module 620. The energy harvesting controller 610 is shown here as being part of the control module 710 and communicates with the RFID tag controller 514 and the sensor processing controller 512. The energy harvesting controller 610 is responsible for assessing the power needs of the tag module 540 and the sensor module 520 and can divert power from its storage element 632 to the tag module 540 and the sensor module 520 as necessary.

Figure 7B:
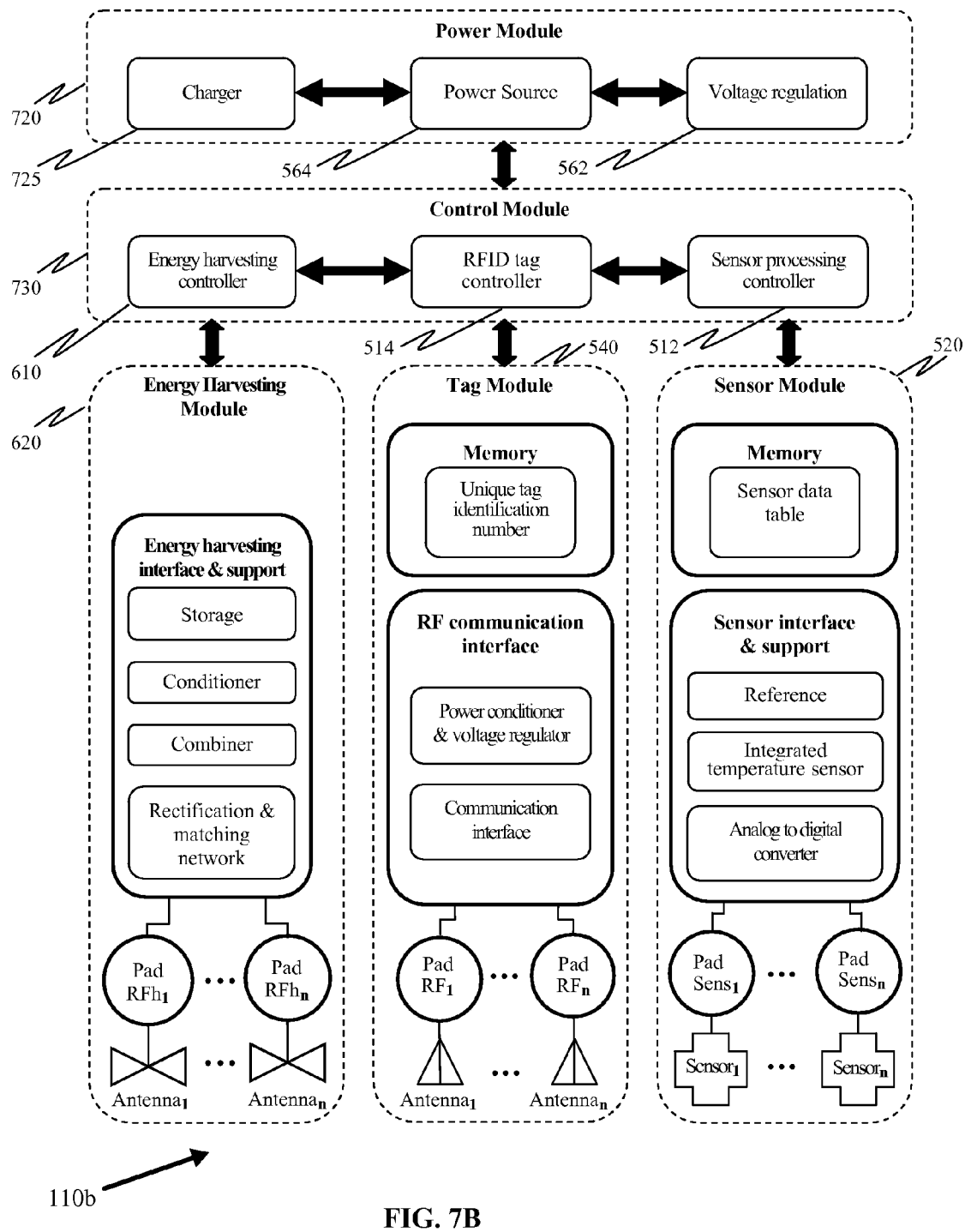
FIG. 7B is a block diagram illustrating an active wireless RF addressable tag architecture with a sensor module combined with an illustrative EM energy harvesting sub-system architecture according to an embodiment herein.

FIG. 7B is an illustrative block diagram of an instantiation of a BAP or active sensor tag 110*b* that includes the energy harvesting module 620. The difference between this sensor tag 110*b* of FIG. 7B and sensor tag 110*a* of FIG. 7A is the addition of the power module 720 whose purpose is to control and distribute power to the control module 730, the tag module 540, and the sensor module 520 in a BAP or active sensor tag 110*b*. The power module 720 includes, but is not limited to, a charger 725, a power source 564, and voltage regulation 562.

The charger 725 controls the continuous, periodic, or sporadic charging of energy storage devices, in particular the power source 564 which may be a capacitor, supercapacitor, plastic battery, polymer battery, Li-Ion batteries, or any rechargeable energy storage technology. The voltage regulation sub-system 562 regulates the voltage and/or current that is needed to charge/recharge the power source 564 or divert power to the tag module 540 and/or the sensor module 520 as determined by the control module 730.

Figure 8:
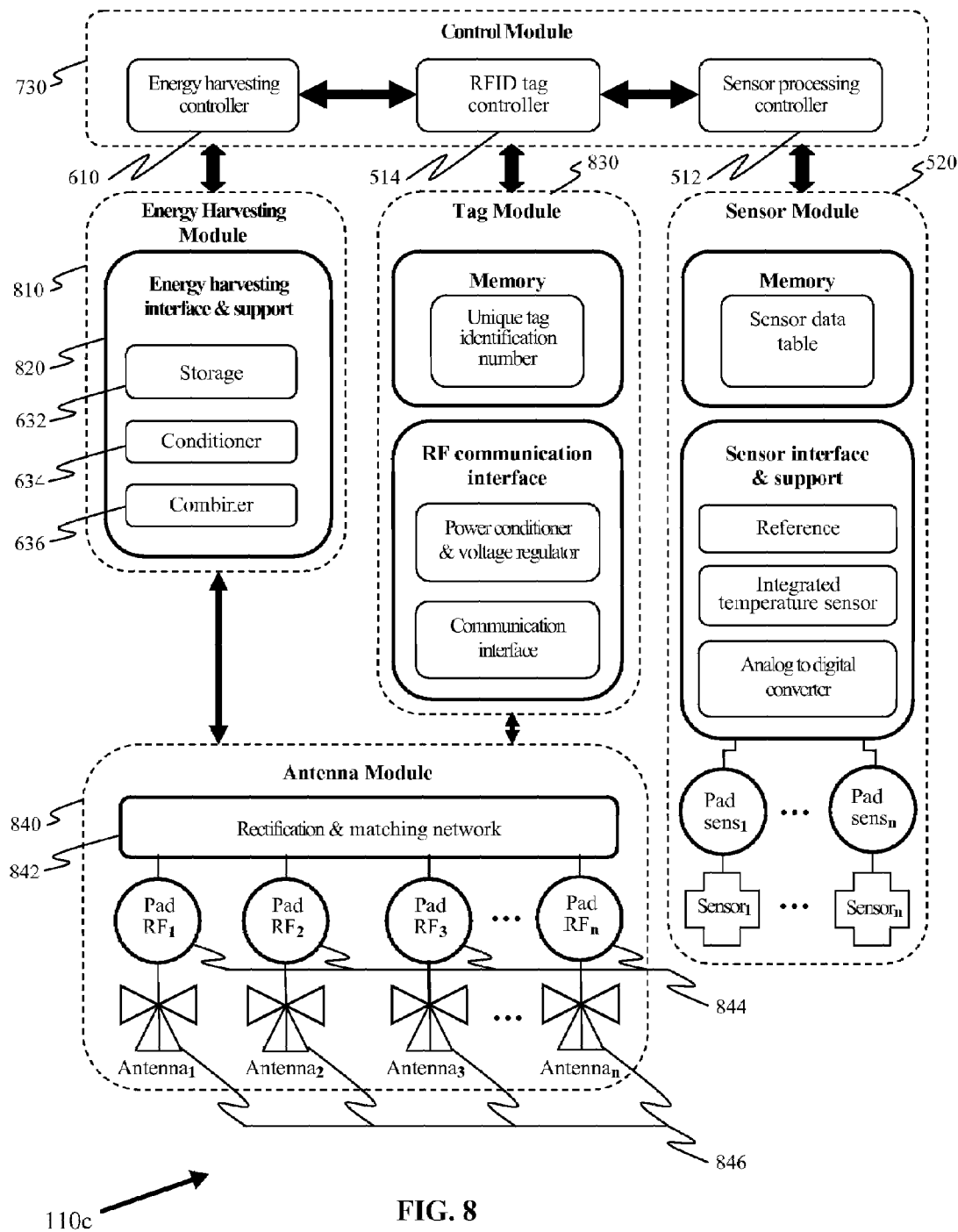
FIG. 8 is a block diagram illustrating a passive wireless RF addressable tag architecture with a sensor module, an EM energy harvesting sub-system, and an antenna module that could be used for RF communication with a reader as well as to harvest ambient EM energy according to an embodiment herein.

FIG. 8 is a block diagram of another illustrative example of a sensor tag 110*c* with EM energy harvesting capability. As with the sensor tag 110*a* of FIG. 7A and sensor tag 110*b* of FIG. 7B, the sensor tag 110*c* of FIG. 8 comprises a control module 730, a sensor module 520, a tag module 830, an energy harvesting module 810, and an antenna module 840. The tag module 830 differs from the tag module 540 of FIGS. 5A, 5B, 7A, and 7B in that there are no RF pads 554 and no antennas 556. The remaining functionality of the tag module 830 is the same as described above.

Likewise, the energy harvesting module 810 differs from the energy harvesting module 620 of FIGS. 6, 7A, and 7B in that there are no RF pads 554 and no RF antenna 556, nor are there RFh pads 640 or energy harvesting antennas 650 associated with this module 810. The remaining components, storage 632, conditioner 634, and combiner 636 have the same functionality as described above.

The antenna module 840 serves both the tag module 830 and the energy harvesting module 810. An antenna or a multitude of antennas 846 are used for both RF EM energy harvesting and for bidirectional RF communications with an RFID, hybrid RFID-WiFi or hybrid RFID-WiFi-Cell phone reader. The antenna or antennas are designed to optimize RFID read range as well as to optimize $A_{eff}$. Each antenna 846 is connected via an RF pad 844 to the rectification and matching network 842.

The rectification and matching network 842 is used to match the impedance of the antenna(s) 846 to that of the rectifier(s) as described above. In the context of FIG. 8, the rectification and matching network 842 includes the rectifier(s). Moreover, those skilled in the art would readily understand that diodes, transmission lines, microstrip elements, and surface mount components could be further included in the rectification and matching network 842 in order to provide the rectifier(s). Since this network 842 also allows RF communications to occur, frequencies corresponding to those used by the RFID, RFID-WiFi, or RFID-WiFi-Cell phone reader (not shown in FIG. 8) are preferably isolated and directed to the communication interface 550 on the tag module 830. The harvested EM energy, once rectified, is sent first to the combiner 636, then to the conditioner 634, and finally to storage 632 as described above.

Figure 9A:
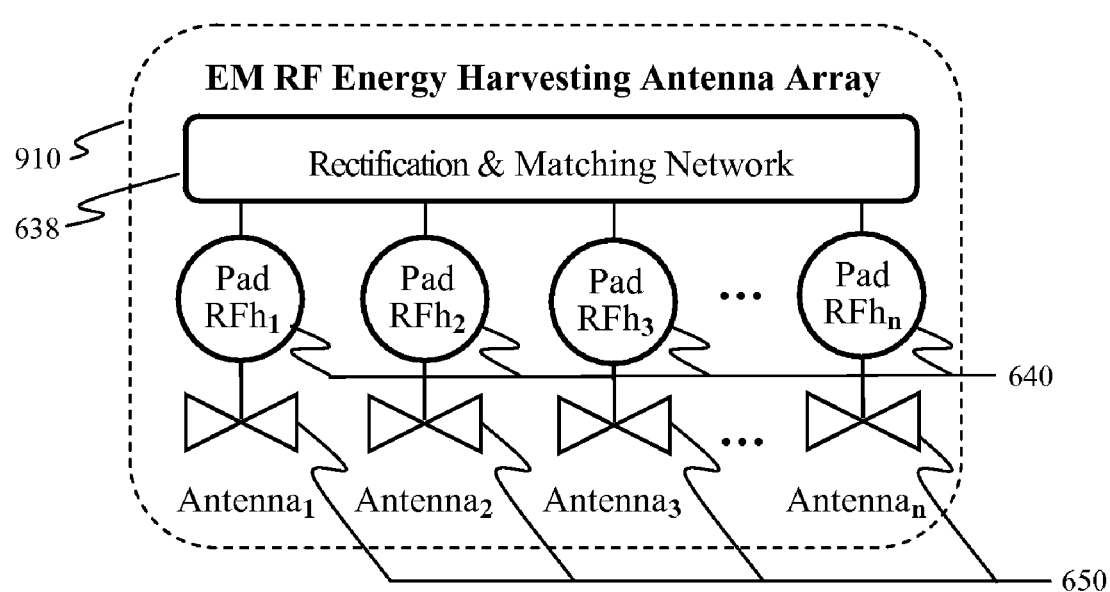
FIG. 9A is a block diagram illustrating an example of an EM energy harvesting architecture comprising an antenna or an array of antennas with associated rectification and matching networks according to an embodiment herein.
Figure 9B:
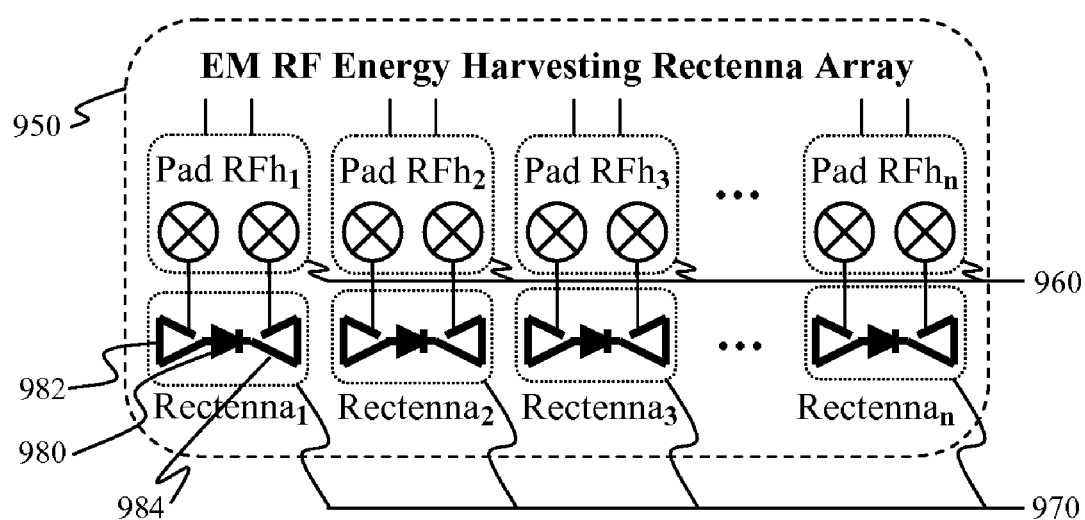
FIG. 9B is a block diagram illustrating an example of an EM energy harvesting architecture comprising a rectenna (rectifying antenna) or an array of rectennas with rectification and matching built into each rectenna according to an embodiment herein.

FIG. 9A is an illustrative example of a block diagram of one of many possible designs for an EM RF energy harvesting antenna array module 910 in accordance with the embodiments herein, with the functionality of the various components included therein as previously described above. FIG. 9B is an illustrative example of a block diagram of an alternate method for harvesting EM RF energy. In this aspect of the embodiments herein, an EM RF energy harvesting rectenna array module 950 is provided as a possibly more efficient way to harvest ambient EM RF energy.

In FIG. 9B, an array of rectennas 970, Rectenna$_1$, . . . , Rectenna$_n$, each comprise a pair of antennas 982, 984, optimized to collect a broad range of RF frequencies having time-varying polarization states, directly integrated with an impedance matched rectifier 980. Each rectenna 970 could be made up of two interdigitated antennas, one with a clockwise winding 982, the other with a counterclockwise winding 984, with the rectifier 980 connected between the two inner ports of the antennas. The rectified signals are collected from the two outermost ports of the rectenna 970 and connected to pads RHh$_1$, . . . , RFh$_n$, 960.

The techniques provided by the embodiments herein may be implemented on an integrated circuit (IC) chip or using printable electronic technologies (not shown). The chip or printable electronic circuit design is created in a graphical computer programming language, and stored in a computer storage medium (such as a disk, tape, physical hard drive, or virtual hard drive such as in a storage access network). If the designer does not fabricate chips or printable electronic circuits or the photolithographic masks used to fabricate chips or printable electronic circuits, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII or CIF) for the fabrication of photolithographic masks, which typically include multiple copies of the chip design in question that are to be formed on a wafer or printed on a suitable substrate. The photolithographic masks are utilized to define areas of the wafer or printable electronic circuits (and/or the layers thereon) to be etched or otherwise processed or printed.

The resulting integrated circuit chips or printable electronic circuits can be distributed by the fabricator in raw wafer form (that is, as a single wafer that has multiple unpackaged chips), as a bare die, or in a packaged form or as individual printed circuits or in a sheet or roll of printed circuits. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip might then be integrated with other chips, discrete circuit elements, and/or other signal processing devices as part of either (a) an intermediate product, such as a mother or daughter-board, or (b) an end product. The end product can be any product that includes integrated circuit chip or chips and/or printed circuits, ranging from toys and other low-end applications to advanced computer products having a display, a keyboard or other input device, and a central processor.

Harvesting ambient EM energy would transform a purely passive sensor into an autonomous sensor 110a, 110b, 111c capable of periodic or sporadic sensor data acquisition, data logging and storage at times other than when being actively interrogated by a reader 160 as well as providing the necessary energy to either autonomously transmit a notable "sensor event", broadcast an alarm or "read me!" signal 460, 485, 490 when a threshold of the sensor 110a, 110b, 110c has been exceeded or when a combination of various thresholds of the sensor 110a, 110b, 110c have been exceeded.

The combination of passive and/or BAP and/or active wireless sensors 110a, 110b, 110c having ambient EM energy harvesting capabilities and wireless communication capabilities as provided by the embodiments herein provide a new low cost means for remotely sensing the environment, monitoring the state of a home, buildings, structures, goods and devices as well as remote and local personal/patient monitoring, medical diagnostic and medical care solutions.

Cell phones, PDAs and PCs 170 are pervasive electronic devices that are already networked via the Internet. A combination or integration of RFID readers, WiFi technologies and/or cell phone technologies into a hybrid reader that transparently communicates with RFID sensor tags, the Internet and cell phone networks would facilitate the widespread deployment and usage of passive sensor tags equipped with EM energy harvesting technology.

Broadband wireless communications networks such as WiFi (including WiMax™ telecommunication equipment and WiBro™ telecommunication equipment and any combination of IEEE 802.1x (where x is used to convey any or all of the following: 1a, 1b, 1g, 5 or 6), IEEE 802.15.4 "Zigbee®" electronic devices, Bluetooth® telecommunication equipment, HomeRF® computer hardware/software, HiperLAN/1 and HiperLAN/2) are being widely deployed in offices, factories, warehouses, stores, homes, communities, and cities. With long read ranges (up to several hundred feet), RFID tags and RFID readers can benefit from aspects of the embodiments herein by: using RFID and/or WiFi for short range communication between a tag reader and wireless sensor tags; using the WiFi and/or the cellular network infrastructure to communicate the acquired sensor tag data over the Internet or cellular telephone networks (bi-directionally); and using WiFi routers/transceivers or cellular base stations as a source of ambient EM energy, with known frequency, that can be optimally harvested to provide energy to inexpensive passive (BAP and/or active tags with rechargeable energy sources) sensor tags.

Generally, the embodiments herein provide a technique for harvesting ambient RF EM energy for supplying, storing, recharging or supplementing the energy necessary to power active, BAP or passive wireless electronic devices, sensors and sensor networks, allowing them to become autonomous "data loggers" and/or empowering them to transmit their unique identification and sensor information when a sensed variable exceeds a threshold and triggers a vital "sensor event". The data gathered by these autonomous data loggers can also be transparently read at any time by a variety of reader technologies such as RFID readers, cell phones, personal data assistants, personal computers, WiFi, WiMax™telecommunication equipment and WiBro™ telecommunication equipment, including IEEE 802.1x (where x is used to convey any or all of the following: 1a, 1b, 1g, 5, and 6), "Zigbee®" electronic devices, Bluetooth® telecommunication equipment, HomeRF® computer hardware/software, HiperLAN/1and HiperLAN/2 and any hybrid combinations thereof. The embodiments herein also provide a hybrid RFID-WiFi reader/transceiver 340 and a hybrid RFID-WiFi-cell phone reader/transceiver 350. The RFID reader module communicates with RFID tags, the WiFi module supplies ambient energy which the passive sensor tags are equipped to harvest and provides connectivity to the Internet and may also read WiFi sensor tags, and the cell phone module provides connectivity to cellular telephone networks.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:
1. An electronic device comprising:
   a control module comprising an energy harvesting controller;
   a tag module controlled by said control module;
   a sensor module controlled by said control module;
   an energy harvesting module controlled by said energy harvesting controller and adapted to wirelessly collect ambient radio frequency (RF) electromagnetic (EM) energy; and
   a power module adapted to provide a power supply for said control module, said power supply being generated by the collected ambient RF EM energy,
   wherein said energy harvesting controller is adapted to (i) assess power requirements of each of the tag and sensor modules, (ii) transfer power from said energy harvesting module to any of said tag and sensor modules, and (iii) charge a local energy storage device.

2. The electronic device of claim 1, further comprising an antenna module shared by said energy harvesting module and said tag module.

3. The electronic device of claim 2, wherein said antenna module comprises:
   a rectification and impedance matching network;
   at least one RF pad operatively connected to said rectification and impedance matching network; and
   at least one antenna operatively connected to each of said at least one RF pad.

4. The electronic device of claim 1, wherein said tag module comprises:
   a memory component;
   a RF communication interface operatively connected to said memory component;
   at least one RF pad operatively connected to said RF communication interface; and
   at least one antenna operatively connected to each of said at least one RF pad.

5. The electronic device of claim 1, wherein said sensor module comprises:
   a memory component;
   a sensor interface and support sub-system operatively connected to said memory component;
   at least one sensor pad operatively connected to said sensor interface and support sub-system; and
   at least one antenna operatively connected to each of said at least one sensor pad.

6. The electronic device of claim 1, wherein said sensor module comprises:
   a memory component;
   a sensor interface and support sub-system operatively connected to said memory component; and
   at least one antenna operatively connected to sensor interface and support sub-system.

7. The electronic device of claim 1, wherein said control module further comprises:
   a radio frequency identification (RFID) tag controller; and
   a sensor processing controller operatively connected to said RFID tag controller.

8. The electronic device of claim 1, wherein said energy harvesting module comprises:
   an energy harvesting interface and support sub-system;
   at least one RF harvesting pad operatively connected to an energy harvesting interface and support sub-system; and
   at least one antenna operatively connected to each of said at least one RF harvesting pad.

9. The electronic device of claim 1, wherein said energy harvesting module comprises:
   an energy harvesting interface and support sub-system;
   at least one pair of RF harvesting pads operatively connected to said energy harvesting interface and support sub-system; and
   at least one rectenna operatively connected to each of said at least one pair RF harvesting pads.

10. The electronic device of claim 9, wherein said energy harvesting interface and support sub-system comprises:
    a storage component;
    a power conditioner component operatively connected to said storage component; and
    a combiner operatively connected to said power conditioner.

11. The electronic device of claim 10, wherein said energy harvesting interface and support sub-system comprises a rectification and impedance matching network operatively connected to said combiner.

12. The electronic device of claim 1, wherein said power module comprises:
   a power charger;
   a power source operatively connected to said power charger; and
   a voltage regulator operatively connected to said power source.

13. The electronic device of claim 1, wherein said collected ambient RF EM energy enables said electronic device to be a fully autonomous data collector, alarm generator, event generator, data logger, and data processor independent of any other device.

14. The electronic device of claim 1, wherein said power supply is generated only by said collected ambient RF EM energy.

15. A system comprising:
   an ambient radio frequency (RF) electromagnetic (EM) energy source;
   a sensor reader operatively connected to said ambient RF EM energy source; and
   a sensor in communication with said sensor reader, said sensor comprising:
      a control module comprising an energy harvesting controller;
      a tag module controlled by said control module;
      a sensor module controlled by said control module;
      an energy harvesting module controlled by said energy harvesting controller and adapted to wirelessly collect said ambient RF EM energy; and
      a power module adapted to provide a power supply for said control module, said power supply being generated by the collected ambient RF EM energy,
      wherein said energy harvesting controller is adapted to (i) assess power requirements of each of the tag and sensor modules, (ii) transfer power from said energy harvesting module to any of said tag and sensor modules, and (iii) charge a local energy storage device.

16. The system of claim 15, wherein said sensor further comprises an antenna module shared by said energy harvesting module and said tag module.

17. The system of claim 16, wherein said antenna module comprises:
   a rectification and impedance matching network;
   at least one RF pad operatively connected to said rectification and impedance matching network; and
   at least one antenna operatively connected to each of said at least one RF pad.

18. The system of claim 15, wherein said tag module comprises:
   a memory component;
   a RF communication interface operatively connected to said memory component;
   at least one RF pad operatively connected to said RF communication interface; and
   at least one antenna operatively connected to each of said at least one RF pad.

19. The system of claim 15, wherein said sensor module comprises:
   a memory component;
   a sensor interface and support sub-system operatively connected to said memory component;
   at least one sensor pad operatively connected to said sensor interface and support sub-system; and
   at least one antenna operatively connected to each of said at least one sensor pad.

20. The system of claim 15, wherein said sensor module comprises:
   a memory component;
   a sensor interface and support sub-system operatively connected to said memory component; and
   at least one antenna operatively connected to sensor interface and support sub-system.

21. The system of claim 15, wherein said control module further comprises:
   a radio frequency identification (RFID) tag controller; and
   a sensor processing controller operatively connected to said RFID tag controller.

22. The system of claim 15, wherein said energy harvesting module comprises:
   an energy harvesting interface and support sub-system;
   at least one RF harvesting pad operatively connected to an energy harvesting interface and support sub-system; and
   at least one antenna operatively connected to each of said at least one RF harvesting pad.

23. The system of claim 15, wherein said energy harvesting module comprises:
   an energy harvesting interface and support sub-system;
   at least one pair of RF harvesting pads operatively connected to said energy harvesting interface and support sub-system; and
   at least one rectenna operatively connected to each of said at least one pair RF harvesting pads.

24. The system of claim 15, wherein said energy harvesting interface and support sub-system comprises:
   a storage component;
   a power conditioner component operatively connected to said storage component; and
   a combiner operatively connected to said power conditioner.

25. The system of claim 24, wherein said energy harvesting interface and support sub-system comprises a rectification and impedance matching network operatively connected to said combiner.

26. The system of claim 15, wherein said power module comprises:
   a power charger;
   a power source operatively connected to said power charger; and
   a voltage regulator operatively connected to said power source.

27. The system of claim 15, wherein said collected ambient RF EM energy enables said electronic device to be a fully autonomous data collector, alarm generator, event generator, data logger, and data processor independent of any other device.

28. The system of claim 15, wherein said sensor reader comprises any of a cell phone, a personal display assistant (PDA), a personal computer (PC) reader, a radio frequency identification (RFID) reader, a broadband wireless fidelity (WiFi) device, and a combination thereof.

29. The system of claim 15, wherein said power supply is generated only by said collected ambient RF EM energy.

30. The system of claim 15, wherein said sensor is adapted to transmit a wireless signal to said sensor reader, and wherein said sensor reader is adapted to receive the transmitted wireless signal from said sensor.

31. The system of claim 15, wherein said collected ambient RF EM energy facilitates transmission of said wireless signal when a selected sensor variable meets a predetermined threshold.

32. The system of claim 15, wherein said ambient RF EM energy source comprises a wireless fidelity (WiFi) router adapted to allow said sensor reader to communicate over the Internet.

33. The system of claim 15, wherein said ambient RF EM energy source comprises a hybrid wireless fidelity (WiFi) router transceiver adapted to allow said sensor reader to communicate over the Internet.

34. The system of claim 15, wherein said sensor is a RF ambient EM energy harvesting sensor and is arranged with a plurality of other said sensors each adapted to collect data for climate control, security alarms, environmental alarms, and information gathering from other devices located within a communicable distance from said sensor, wherein all of said sensors are adapted to be any of locally and remotely monitored via any of the Internet and a cell phone network.

35. A device comprising:
   a control module comprising:
      an energy harvesting controller;
      a radio frequency identification (RFID) tag controller operatively connected to said energy harvesting controller; and
      a sensor processing controller operatively connected to said RFID tag controller;
   a tag module controlled by said control module;
   a sensor module controlled by said control module; and
   an energy harvesting module directly connected to said control module and controlled by said energy harvesting controller, wherein said energy harvesting module is adapted to wirelessly collect, process, and store ambient radio frequency (RF) electromagnetic (EM) energy,
   wherein said energy harvesting controller is adapted to (i) assess power requirements of each of the tag and sensor modules, (ii) transfer power from said energy harvesting module to any of said tag and sensor modules, and (iii) charge a local energy storage device, and
   wherein power for operation of said control module, said tag module, said sensor module, and said energy harvesting module is generated only by the collected ambient RF EM energy.

* * * * *